(12) United States Patent
Van Kuilenburg et al.

(10) Patent No.: US 9,522,811 B2
(45) Date of Patent: Dec. 20, 2016

(54) DEVICE FOR DISPLACING LIVESTOCK FEED

(71) Applicant: Lely Patent N.V., Maassluis (NL)

(72) Inventors: Jan Martinus Van Kuilenburg, Maassluis (NL); Karel Van Den Berg, Maassluis (NL); Martinus Cornelis Johannes Buijs, Maassluis (NL)

(73) Assignee: Lely Patent N.V., Maassluis (NL)

( * ) Notice: Subject to any disclaimer, the term of this patent is extended or adjusted under 35 U.S.C. 154(b) by 98 days.

(21) Appl. No.: 14/391,508

(22) PCT Filed: Mar. 25, 2013

(86) PCT No.: PCT/NL2013/050216
§ 371 (c)(1),
(2) Date: Oct. 9, 2014

(87) PCT Pub. No.: WO2013/157934
PCT Pub. Date: Oct. 24, 2013

(65) Prior Publication Data
US 2015/0104273 A1    Apr. 16, 2015

(30) Foreign Application Priority Data
Apr. 20, 2012 (NL) .................................. 2008673

(51) Int. Cl.
*A01K 5/02* (2006.01)
*B66C 17/06* (2006.01)
(Continued)

(52) U.S. Cl.
CPC ............. *B66C 17/06* (2013.01); *A01K 5/0266* (2013.01); *B65G 67/04* (2013.01); *B66C 13/18* (2013.01)

(58) Field of Classification Search
CPC .......... A01K 5/0266; A01K 5/02; B66C 17/06
See application file for complete search history.

(56) References Cited

U.S. PATENT DOCUMENTS

| 4,496,063 A | * | 1/1985 | Ishii | ........................ B66C 17/06 212/270 |
| 4,503,798 A | * | 3/1985 | Hergeth | ................... D01G 7/10 414/730 |

(Continued)

FOREIGN PATENT DOCUMENTS

| DE | 28 11 281 A1 | 9/1979 |
| DE | 39 21 871 A1 | 1/1991 |

(Continued)

OTHER PUBLICATIONS

International Search Report issued Jul. 31, 2013, in PCT/NL2013/050216, filed Mar. 25, 2013.

*Primary Examiner* — Gene Crawford
*Assistant Examiner* — Thomas Randazzo
(74) *Attorney, Agent, or Firm* — Oblon, McClelland, Maier & Neustadt, L.L.P.

(57) ABSTRACT

The invention provides a livestock feed-displacing device and system, with a grab bucket which can be positioned above a feed kitchen with feed positions by a control unit, wherein the control unit is designed to compose an amount of animal feed from feed material provided in the feed kitchen by positioning the grab bucket at a grabbing position, grabbing livestock feed underneath said grabbing position, positioning the grab bucket at a desired feed-unloading point, such as in a feed wagon, and unloading the grabbed livestock feed at the feed-unloading point, wherein the control unit is designed to earmark, if at least one predetermined clearing-up criterion has been met, livestock feed in the feed kitchen as waste to be removed and to make the device carry out a clearing-up operation, wherein the clearing-up operation comprises the removal of the livestock feed at said feed position by displacing it to another position in the feed kitchen.

25 Claims, 2 Drawing Sheets

Figure 1:
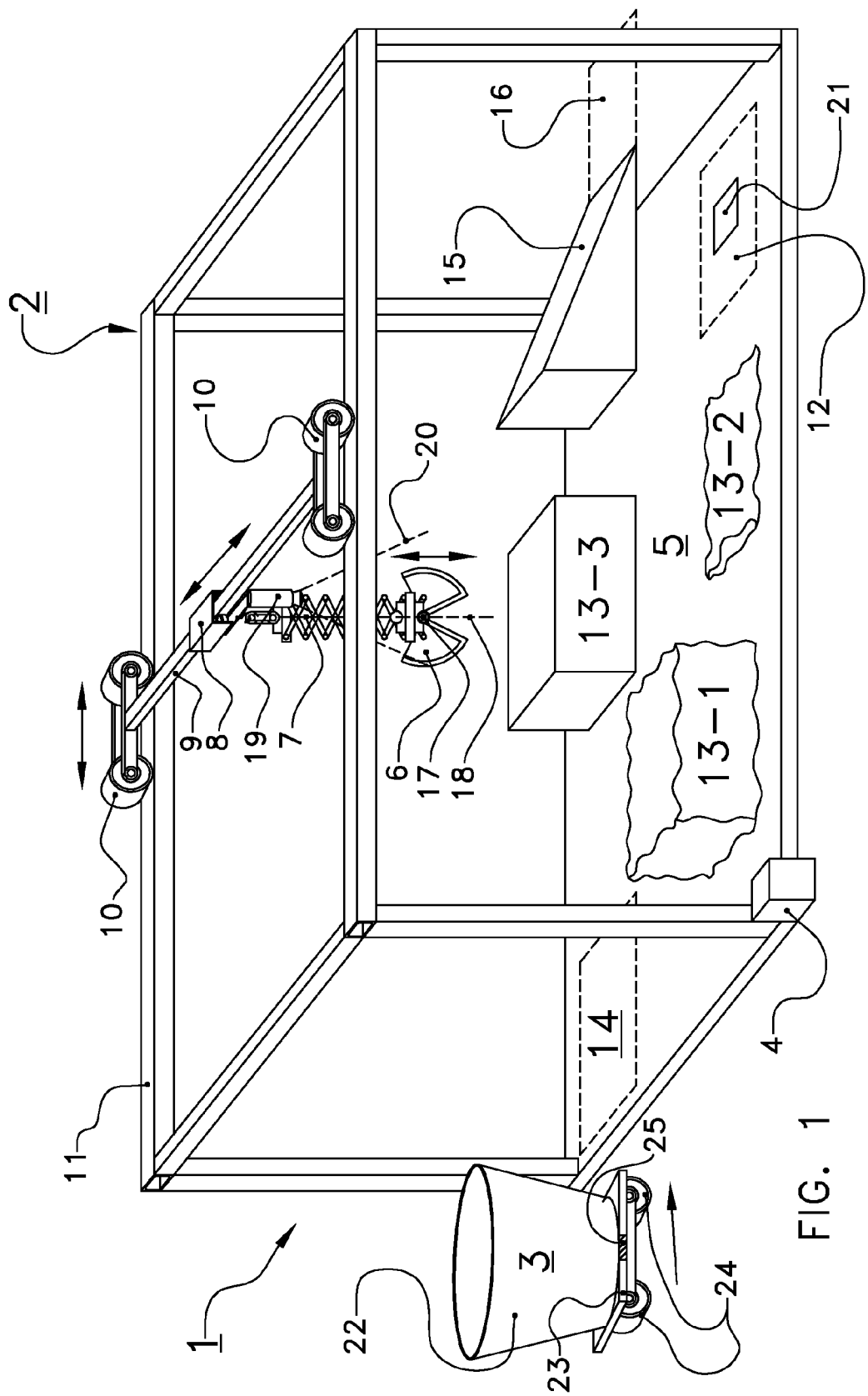

(51) Int. Cl.
 *B65G 67/04* (2006.01)
 *B66C 13/18* (2006.01)

(56) References Cited

U.S. PATENT DOCUMENTS

| | | | | |
|---|---|---|---|---|
| 4,712,511 A | * | 12/1987 | Zamzow | A01K 5/0266 119/51.02 |
| 5,309,864 A | * | 5/1994 | Harmsen | A01K 5/0266 119/51.02 |
| 2010/0017035 A1 | * | 1/2010 | Van Den Berg | A01K 1/01 700/259 |
| 2010/0126423 A1 | * | 5/2010 | Van Den Berg | B66C 3/02 119/57.92 |
| 2010/0326363 A1 | * | 12/2010 | Van Den Berg | A01K 1/105 119/57.92 |
| 2011/0185975 A1 | * | 8/2011 | Van Den Berg | A01K 1/01 119/57.92 |

FOREIGN PATENT DOCUMENTS

| | | |
|---|---|---|
| EP | 2 129 214 B1 | 9/2010 |
| WO | 2008/097080 A1 | 8/2008 |

\* cited by examiner

DEVICE FOR DISPLACING LIVESTOCK FEED

The invention relates to a device for displacing livestock feed, comprising a feed gripping device, and a control unit for the feed gripping device, wherein the feed gripping device comprises a grab bucket which can be operated by the control unit and can be positioned with a vertical and at least one horizontal degree of freedom above a feed kitchen, wherein the feed kitchen comprises at least one, and preferably more than one, feed position on which at least one type of livestock feed is provided, wherein the control unit is designed to receive a feed order, comprising information for composing an amount of animal feed from one or more types of feed material provided in the feed kitchen, and for carrying out the following one or more times on the basis of the feed order:

positioning the grab bucket at a desired grabbing position with respect to the feed kitchen, operating the grab bucket to make it grab at least a part of the livestock feed situated underneath said grabbing position, positioning the grab bucket at a desired feed-unloading point for composing the amount of animal feed to be composed which is to be fed to animals, and operating the grab bucket to make it unload the livestock feed which it has grabbed at the feed-unloading point.

Such devices are known, for example from EP2191714. By means of such devices with overhead cranes or the like, it is possible to automatically compose, for example, animal feed from a set of storage stacks, containers and the like. The object of such automatic systems is inter alia to be labour-saving.

In practice, such systems are often found not to give a sufficient saving in labour. At any rate, an operator still has to spend a relatively large amount of time looking after the environment of such devices. Another drawback is the fact that, in practice, the capacity of such systems appears to be insufficient to be able to feed relatively large numbers of animals.

It is an object of the present invention to provide a device of the abovementioned kind which achieves an even greater saving in labour, in particular in the field of looking after the working environment of the device and/or which has a larger capacity.

This object is achieved by the invention by means of a device according to Claim 1, in particular a device for displacing livestock feed, comprising a feed gripping device, and a control unit for the feed gripping device, wherein the feed gripping device comprises a grab bucket which can be operated by the control unit and can be positioned with a vertical and at least one horizontal degree of freedom above a feed kitchen, wherein the feed kitchen comprises at least one, and preferably more than one, feed position on which livestock feed is provided, wherein the control unit is designed to receive a feed order, comprising information for composing an amount of animal feed from one or more types of feed material provided in the feed kitchen, and for carrying out the following one or more times on the basis of the feed order:

positioning the grab bucket at a desired grabbing position with respect to the feed kitchen, operating the grab bucket to make it grab at least a part of the livestock feed situated underneath said grabbing position, positioning the grab bucket at a desired feed-unloading point for composing the amount of animal feed to be composed which is to be fed to animals, and operating the grab bucket to make it unload the livestock feed which it has grabbed at the feed-unloading point, wherein the control unit is furthermore designed to earmark, if at least one predetermined clearing-up criterion has been met, the livestock feed for a clearing-up operation at least at part of at least one feed position in the feed kitchen which does not form part of a feed order, and to make the device carry out a clearing-up operation, wherein the clearing-up operation comprises the removal of at least part of the livestock feed on the part of said feed position by displacing it to another position in the feed kitchen.

By means of such a device, it is possible to ensure that a "feed kitchen", which in the present context is understood to mean a location containing one or more supplies of livestock feed of one or more types from which the system can compose portions of animal feed, is automatically kept clean. This cleaning operation, which previously had to be carried out by the operator himself, takes up a relatively large amount of time, so that the present device can also result in a relatively large time saving. It should be noted here that the cleaning operation has to be distinguished from the operation of composing the livestock feed. Composing animal feed is a task which requires great deal of precision, as living beings depend on it, in principle without supervision. Therefore, the separation between livestock feed and material to be cleared-up is preferably strictly adhered to. Therefore, earmarking material which is to be permanently removed as no longer being fit to form part of animal feed is an essential part of the programming of the control unit, as will be explained further below. In order to be able to carry out said earmarking operation, in particular automatically, a criterion which is equally essential is required. After it has been earmarked, the earmarked animal feed can no longer form part of the animal feed to be composed. This can be achieved in various ways, as will be explained in more detail below. It will also be clear that said clearing-up operation will take place independently from (executing) a feed order.

Furthermore, the device according to the invention has, as a result of the following. Feed gripping devices like the one described here take a relatively long time to carry out a single grabbing action. Composing livestock feed may therefore in all take up a few tens of minutes, in particular where the total amounts of a feed order are relatively large, such as 500 kg and more. Now if only little livestock feed is available at one or more feed positions, it will take much more time to compose a feed order, as the grab bucket will often not be able to grab as often as is necessary for the feed order. The gripping device will collect the leftovers in the feed kitchen, as it were. As a result of removing at least these leftovers by clearing-up, for example by combining them, fewer piles of livestock feed will remain, but these piles will be such that fewer grabs will then be required for a feed order, so that the feed order can thus be ready in a shorter amount of time. As a result thereof, the capacity of the device can be increased, so that it can also satisfy the demand for larger numbers of animals to be fed. All this will be explained in more detail below.

It should be noted here that such a gripper device could also process other critical materials, such as bedding material, instead of livestock feed. As livestock feed is a highly critical material, wherein, according to the prior art, clearing-up operations form an essential part of the work to ensure the required cleanliness, the present invention is eminently suitable for and aimed at feed applications. It should furthermore be noted that "composing" livestock feed does not necessarily mean that two types of feed have to be combined. Compiling livestock feed on the basis of a single type, but in a specified amount, is also regarded as composing livestock feed.

Specific embodiments are described in the dependent claims, including an embodiment, wherein the clearing-up operation comprises a combining operation, comprising grabbing at least a part of the livestock feed on the part of said feed position and displacing the grabbed livestock feed either to another part of said feed position or to another feed position on which livestock feed of the same type as the grabbed livestock feed is provided. Obviously, this combining operation is preferably carried out using livestock feed of one and the same type, as this would otherwise result in undesirable mixing. The advantage of combining feed is that this results in larger piles of livestock feed, so that livestock feed can then be grabbed more efficiently. Consequently, fewer grabbing operations are thus required, as the "half loads" resulting from small piles of livestock feed can thus be prevented. As the repeated displacement of the grab bucket from feed-unloading point to feed position and back takes a relatively large amount of time, a lot of capacity can be gained by reducing the number of displacements according to the invention. Criteria for combining feed are described below.

In an embodiment, the clearing-up operation is a cleaning operation and removing the livestock feed comprises grabbing it, displacing it and unloading it at a feed-waste collecting position. Of course, it is also possible to combine the clearing-up and combining operations. By carrying out the clearing-up in this way, optimum use is made of the means which are already present anyway, in particular the gripping device, as this can grab the livestock feed which is earmarked as having to be removed and then move it to the feed-waste collecting position and dump it there. Other measures for removing the earmarked livestock feed are not excluded, such as trap doors, slides and the like. However, such measures render the device unnecessarily complicated.

Yet another, additional or alternative, embodiment is characterized by the fact that the cleaning operation comprises the removal of a predetermined upper part of the livestock feed at a feed position, in particular if no part of said livestock feed has yet been grabbed in order to fulfil a feed order. The removal of the upper part, in particular by the gripping device grabbing and displacing it, has the advantage that a layer which is for whatever reason undesired or cannot be used can be removed. In particular, this may be the case with a fresh pile of silage, since this is (almost) always cut or otherwise taken from a large pile of silage which has been covered with plastic film or the like. As the large (silage) pile is gradually being used up, more and more of the plastic is removed. However, in this case the outer side of the remaining livestock feed will be exposed to the outside air and thus degrade, for example as a result of overheating or the formation of mould. By now placing a portion of this livestock feed at a feed position in a suitable manner, in particular with the outer side of lesser quality turned upwards, towards the grab bucket, the gripping device is able to grab and remove said outer side by control of the control device. This may be carried out, for example, up to a predetermined depth, which depth is either fixed or made dependent on the type of livestock feed, the time which has passed since the last displacement of livestock feed, or the weather conditions, etc. Such a cleaning operation will be carried out as the first gripping operation for the freshly delivered pile of livestock feed, i.e. before any feed order is carried out in connection with said freshly delivered pile of livestock feed. Incidentally, it is also possible for such a cleaning operation, wherein only a predetermined upper part of a pile of livestock feed is removed, to be carried out between two feed orders, for example if no gripping operation has taken place on said pile of livestock feed for at least a predetermined period of time, as in the case of a failure or the like. It will be clear that the livestock feed which is grabbed in these cases will be moved to the waste collecting position.

In particular, therefore, the other position in the feed kitchen is a feed-waste collecting position which is different from the feed-unloading point. Thus, it is possible to adhere to a very strict separation between animal feed and material to be removed, and undesired mixing is less likely to occur. Nevertheless, it is also possible to dump material to be removed in the same location as the animal feed to be composed, provided a physically and/or administratively separate discharge is provided, such as via different collecting receptacles, by means of a pivotable guide track or a closable chute which is open when catching material to be removed and closed when unloading animal feed, etc. In particular, the feed-waste collecting position is the same as a waste-dumping position, such as a sewer and the like, and alternatively, or more particularly, a part of the feed kitchen intended for that purpose. It should be noted that in the case of a combining operation, the other position will not be a feed-waste collecting position, as the material grabbed in said first case is being reused at another feed position or at part of said first feed position. Furthermore, it should be noted that whenever the expressions "clearing-up" or "clearing-up operation" are used, this may refer both to "combining" and "cleaning" as well as a combination thereof.

In embodiments, the at least one clearing-up criterion includes that the device is not busy carrying out a feed order. A feed order will in most cases consist of two or more grabbing actions of livestock feed, which offers the possibility of carrying out the clearing-up operation in between the two such grabbing actions. All this is certainly not excluded, in particular since by means of such a grabbing action, a pile of livestock feed could be made to meet the at least one clearing-up criterion. Nevertheless, in practice, it will actually be advantageous to wait before carrying out the clearing-up operation until no feed order has to be carried out, since the animal feed to be composed will then become available as quickly as possible and will involve as little waiting as possible. After all, it will be more advantageous if the clearing-up operation is only carried out when an amount of ordered and composed animal feed is on its way to the animals. More particularly, the at least one clearing-up criterion includes that the control unit does not contain any unfinished, that is a non-executed, feed order, and/or that the control unit only contains one or more feed orders which do not have to be started within a predetermined time, in particular within a predetermined time after now. This means that no clearing-up operation is preferably started or executed if a second feed order, for example for a second feed-collecting receptacle, is stored in the control unit after a first feed order has been executed. In this case as well, composing the livestock feed preferably has priority over the clearing-up operation. An exception to this may be the situation wherein one or more feed orders are stored in the control unit which only have to be executed over a certain time period, for example because there is no feed-collecting receptacle available. In particular when said certain time period is at least equal to an average, estimated or maximum time required for the clearing-up operation, the clearing-up operation can still be carried out. It should be noted that the clearing-up operation may be a combined clearing-up operation, that is to say a clearing-up operation for two or more feed positions. In such a case, at least a part of the clearing-up operation, in particular a part which relates to clearing-up of one of the respective feed positions, could indeed be carried out, provided the required time period is then shorter than the predetermined time.

A particular embodiment is characterized by the fact that the at least one clearing-up criterion includes that the control unit has not received a feed order for at least a predetermined time period. Thus, the clearing-up operation will only start after a fixed, predetermined time period has lapsed, similar to a screen saver. This has the advantage that no communication has to take place between a feed-collecting receptacle and the control unit, since a clock with a timer suffices. In this case, it is assumed that the probability that no feed order is coming within the time period required for the clearing-up operation becomes sufficiently low when at least said predetermined time period has lapsed. Obviously, if communication with a feed-collecting receptacle, or at least a control unit operating the feed-collecting receptacle, it may be more efficient if a clearing-up operation can start immediately after a feed order has been finished. All this will be explained below later.

Alternatively or additionally, the at least one clearing-up criterion includes that the control unit contains a clearing-up instruction which is still to be carried out. This relates to a "hard" instruction, in particular of a user, for example to replace a type of livestock feed either because of rot or also automatically at a certain fixed or dynamic point in time. This can be taken into account when (automatically) grouping and planning the implementation of the feed orders, which is an advantage.

In embodiments, the at least one clearing-up criterion includes a removal condition, and the device is designed or comprises a measuring device which is designed to detect, at least for one feed position, whether said feed position meets the removal condition. In particular, the at least one clearing-up criterion includes that at said feed position there is livestock feed which meets the removal condition. In this case, the device may thus be designed, for example, to monitor per position, on the basis of a stored amount of grabbed livestock feed, when said amount drops below a threshold amount which has been predetermined, in particular as a function of the type of livestock feed or the feed position. Alternatives will be mentioned below. Additionally or alternatively, a measuring device may be provided which monitors this or another parameter, or otherwise provides a signal on the basis of which it is determined whether the removal condition is being met.

In embodiments, the removal condition includes that a value of a predetermined parameter of the livestock feed at said at least one feed position, or a part thereof, meets a predetermined removal criterion. By determining for each feed position whether a removal criterion is being met, it is possible to monitor, for example, the total feed quality in a dynamic and efficient manner, and also to manage the stock. Thus, it is possible to establish a threshold amount for each feed position or type, below which threshold amount a clearing-up operation can be executed, and which threshold amount can be adjusted in a dynamic manner to the "turnover rate", i.e. the consumption per unit time, and to the weather conditions which in turn affect the speed at which feed rots. As mentioned above, the amount of livestock feed which is still present can be determined on the basis of a measured amount of livestock feed which has been grabbed at the feed position. Other examples are given below. In addition, with these and other embodiments, where the term "feed position" is used, this may in principle also be substituted by the expression "part of a feed position", if, for example, only a part of the feed position meets a (removal) criterion.

In particular, the parameter comprises an average height or maximum height of the livestock feed at the feed position, or a part thereof, and the removal condition includes that the parameter value is smaller than a first threshold height, in particular based on the type of livestock feed. Thus, a clear indicator for the amount of livestock feed which is still present is provided in a very simple manner, as monitoring weight on the basis of the amount of livestock feed which has been grabbed is susceptible to faults, caused by unrecorded removal, blowing away, eating away. By measuring the height, advantageously prior to the grabbing operation, at least the true value is measured, and the clearing-up operation is carried out when the height, at most or on average, has fallen below a predetermined threshold value. Advantageously, the height is determined by two or more height measurements, more advantageously by a height profile across at least a line across the feed position, and yet more advantageously by a two-dimensional height profile across the feed position. Thus, it is possible to produce a very accurate estimate of the height and, if the surface area of the feed position is known, therefore also of the volume of the pile of livestock feed. It should be noted that the clearing-up operation, in particular the removal or cleaning, is thus carried out on the basis of the height of, in principle, the entire feed position.

More particularly, the removal condition furthermore includes that the parameter value is greater than a second threshold height. This means that, if the parameter value, in particular the height, drops on average or a maximum below the second threshold value, no clearing-up operation is carried out, or if a clearing-up operation is ongoing this is stopped, wherein said threshold value is obviously lower than the first. After all, it is assumed that the respective feed position is "clean". In any case, livestock feed can no longer be grabbed at said feed position in a sufficiently effective manner, and is in fact risky for the grab bucket, or otherwise no longer desirable. In particular, the second threshold value depends on the type of livestock feed, for example because flour is much more difficult to grab than hay.

In important embodiments, the control unit is designed to determine whether the removal condition has been met locally for each feed position, that is to say on a part of the feed position. This means that, for example, the height has dropped below the first or second threshold value only locally, so that a clearing-up operation can be carried out there, or no longer, while at another part of the feed position livestock feed can still be grabbed without problems. In particular, the clearing-up operation then comprises displacing the livestock feed from said part of the feed position which meets the removal condition to another part of said feed position or to another feed position containing the same type of livestock feed which does not meet the removal condition. Thus, livestock feed is piled up, as it were, so that grabbing can then be carried out in a more efficient manner, in particular more can be grabbed and the grabbing operation is therefore quicker. In other, previously described embodiments, the parameter value, such as the height across the entire feed position, may result in a clearing-up operation.

As a general note, it is pointed out here that a feed position, or feed location, may comprise a single pile of livestock feed of one type, but may also comprise a composed pile, that is to say several piles, of the same type of livestock feed, for example some separate bales of hay. Advantageously, these are positioned adjacent to each other, but this is not obligatory, and it is possible for new bales to be placed elsewhere if the respective positions have become difficult to reach due to certain bales having already been removed. For the feed kitchen, in principle only the entirety of the livestock feed for each type is important in each case.

In embodiments, the parameter comprises a residual amount of livestock feed at the feed position, or a part thereof, and the removal condition includes that the parameter value is smaller than a first threshold amount, in particular based on the type of livestock feed. It is also possible for the directly determined residual amount to serve as parameter in a way similar to the height, described above. For example, if the weight (the mass) of the livestock feed at the feed position drops below a first threshold weight, the clearing-up operation can be carried out. The weight may be determined directly using a sensor underneath the feed position by recording a starting amount and deducting the amounts of livestock feed which have been grabbed, or in any other way. If desired, the removal condition furthermore includes that the parameter value is greater than a second residual amount, still more particularly based on the type of livestock feed. In a way similar to that described for the second threshold value for the height, a lower second threshold weight can also prevent or stop unnecessary clearing-up operations.

As described, the parameter (value) may be determined on the basis of external measurements, such as monitoring a residual weight by recording the amounts of livestock feed which have been grabbed. However, advantageously the device according to the invention comprises a measuring device designed to measure the parameter value for one or more feed positions. Thus, this is a "dedicated" measuring device which can monitor the relevant parameter value in a very efficient manner, so that a clearing-up operation can also be initiated in an expedient manner.

In embodiments, the measuring device is provided on the feed gripping device, in particular on the grab bucket. Due to the fact that the feed gripping device, and in particular the grab bucket, is displaceable above the feed kitchen, at least above the various feed positions, a relatively small measuring field, measuring range or the like is sufficient for the measuring device in this case. At least, the measuring device is also "dedicated" and can get by with very accurately measuring the parameter value for a single pile of livestock feed. The grab bucket in particular is able to come very close to the livestock feed pile, which increases accuracy and flexibility.

Although the choice of measuring device is free to a certain degree, it is advantageous if the measuring device comprises a height-measuring and/or distance-measuring device. As stated before, the height is a simple and reliable parameter to determine an amount. In this case, the height can be determined as an absolute distance from the ground or from a distance up to, for example, a grab bucket (support). For example, the measuring device comprises a laser distance-measuring device, an ultrasound distance-measuring apparatus and/or a 3D-camera. Such distance-measuring devices are very compact, accurate and reliable, and provide a very useful value on the basis of a volume measurement. Here, in particular a 3D-camera offers the additional advantage that it can provide an accurate overview of the height and/or the volume, and (thus) of the amount, of the livestock feed at a feed position in one go and therefore quickly. In this case, the 3D image can be taken prior to, during or after a grabbing operation, with said image subsequently being processed and assessed. However, what is important is that no scanning operation is required to obtain the image. This avoids, for example, the risk of a greatly deviating estimate of the amount being obtained due to the fact that either a "peak" or "trough" is missed because of the askew position of the pile of livestock feed or just because said peak is only of a limited size and is not situated on the scanning line. This drawback is present, for example, in the case of scanning laser measurements.

In embodiments, the measuring device is nevertheless designed to scan a feed position, so that several measurements of the height, or if desired of other parameter(s) can be carried out in a simple manner. Preferably, it is designed to scan during displacement of the feed gripping device, such as to a grabbing or feed position, advantageously to scan in a scanning direction at right angles to the displacement direction of the feed gripping device. Since the device is already moving over the feed position, no time is lost and scanning can be carried out in two dimensions without waste of time.

Advantageously, the device is designed to successively scan several feed positions, in particular all occupied feed positions or all feed positions present, so that it is then respectively known of all said feed positions whether they meet a removal condition. Such a scan may also take place, for example, after the control unit has not received or carried out a feed order for a predetermined time period, at set times or upon an instruction by an operator. The control unit may then be designed for this purpose.

The invention furthermore relates to an assembly of a feed kitchen and a device according to the invention, wherein the feed kitchen comprises at least one, and preferably more than one, feed position for grabbing material provided in the feed kitchen, in particular animal feed. As has already been stated, the feed gripping device according to the invention is very advantageous when composing livestock feed requiring a large capacity and/or a great degree of accuracy, reliability and hygiene. The assembly according to the invention provides these advantages in a "feed kitchen".

In embodiments, the assembly furthermore comprises an autonomous clearing device which is designed to remove at least part of the material in the feed kitchen under the control of the control unit. In the text above, it has been described in each case the grab bucket was used to carry out the clearing-up or cleaning operation. Alternatively or additionally, said operation may be carried out using an autonomous cleaning device, such as a self-propelled cleaning robot, "vacuum cleaner" or pusher, or any other conceivable cleaning device. This not only offers the possibility of providing special modifications on said cleaning device, resulting in a higher possible efficiency, but also offers the possibility for the grab bucket and the autonomous cleaning device to work in parallel, thus wasting less time and achieving an even higher degree of efficiency.

The device furthermore relates to a system of a device according to the invention, in particular an assembly according to the invention, as well as a, in particular autonomous and/or self-propelled, vehicle which is designed to receive the material which has been grabbed by the grab bucket and is to be unloaded at an unloading position in said vehicle, and for subsequently dispensing it again at another position, such as in a trough or otherwise to animals. Such vehicles are known on the market, for example those of Trioliet and Wasserbauer. These can then be filled reliably and accurately by means of the device according to the invention. By systematic and efficient cleaning, a high feed quality can be assured in a more secure manner.

Advantageously, the vehicle comprises a vehicle control unit which is operatively connected to the control unit and is designed to deliver an instruction or information to the control unit. By means of such communication between the vehicle and the device, the clearing-up operation can be driven in an efficient manner, as has already been described above. The instruction or information may comprise a feed order. On the basis of this information, or the lack of it for a certain period of time, the device can then decide to initiate the clearing-up operation.

In embodiments, the vehicle comprises a weighing device for weighing unloaded material which has been received in the vehicle, and the instruction or information comprises information with respect to the weighed amount of material. On the basis of such weight information, the control unit of the device is able to determine whether there is still sufficient livestock feed present at a certain feed position or whether a clearing-up operation is required due to a value exceeding or falling below a threshold value. It should be noted that such a weighing device of the vehicle is often already present in order to be able to determine the amount of livestock feed which is loaded onto the vehicle, or is fed after unloading. These data can then be used efficiently for the device according to the invention.

Advantageously, the vehicle control unit is designed to emit a ready instruction to the control unit, and the control unit is designed to carry out the clearing-up operation on the basis of the ready instruction. The vehicle control unit may, for example, indicate that the feed order is ready, because a sufficient amount of livestock feed has been received. It should be noted that the grabbed amount of livestock feed cannot be predicted with a high degree of accuracy, in particular because, for example, undesired long-stemmed livestock feed may become trapped on the underside of the grab bucket during grabbing, so that too much is being grabbed. Anyhow, weighing the result in the vehicle may be advantageous and the order is only ready when a sufficient amount of livestock feed has been received. If a ready instruction is then emitted to the control unit of the device, the latter can start a clearing-up operation, if necessary, for example a combining operation or a cleaning operation, as has already been described above, or also a part of such an operation, for example carry out a scan to decide whether clearing up is necessary.

Figure 2:
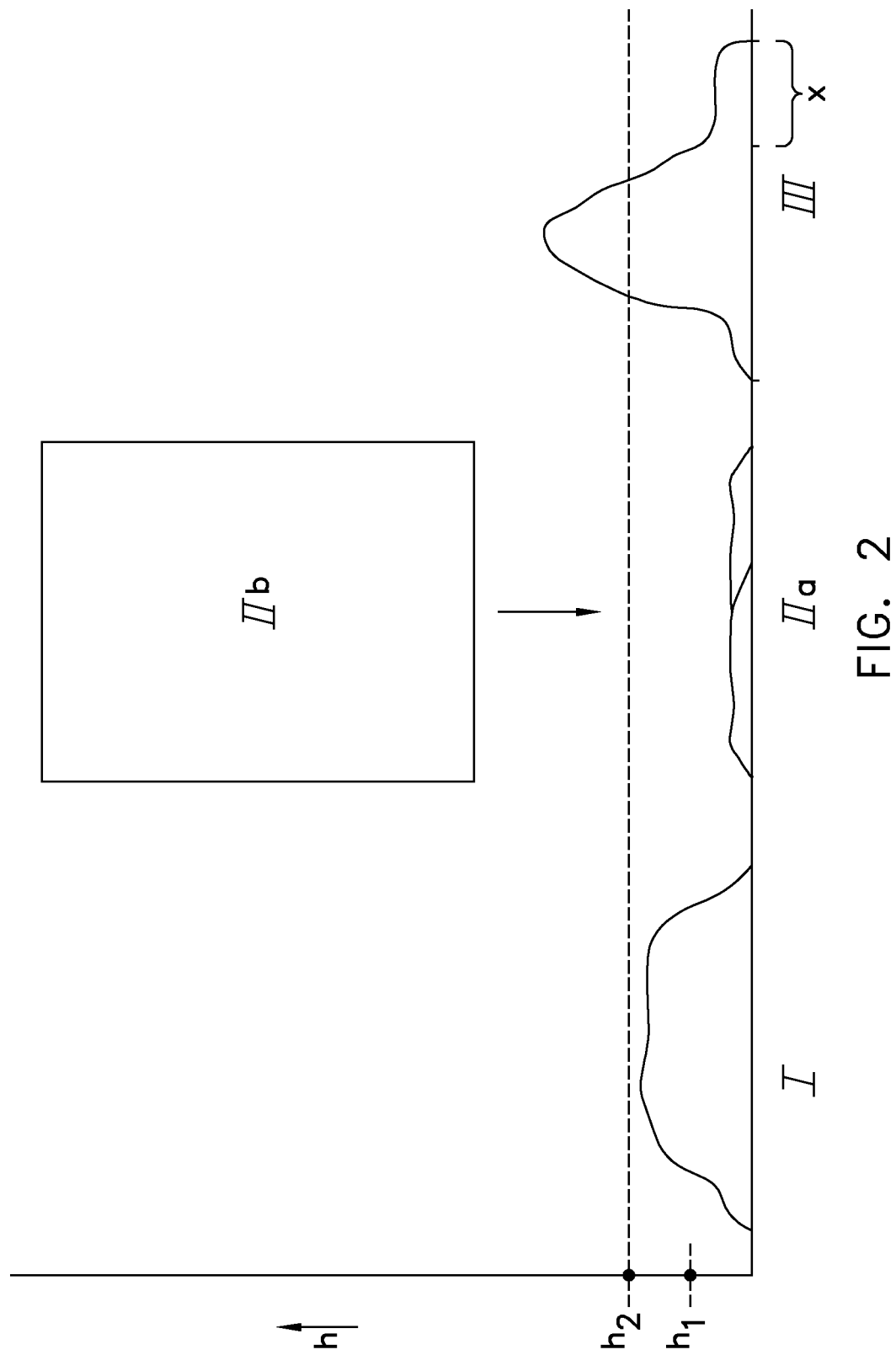

The invention will now be explained in more detail with reference to the drawing which shows some non-limiting embodiments, and wherein:

FIG. 1 diagrammatically shows a perspective view of a system according to the invention; and FIG. 2 shows a diagram with some height profiles of livestock feed piles in order to explain the criteria.

FIG. 1 diagrammatically shows a perspective view of an embodiment of a system comprising a device according to the invention. The system is generally denoted by reference numeral 1 and comprises a feed-displacing device 2 and an autonomous feed wagon 3. Reference numeral 4 denotes a control unit for the system.

The feed-displacing device is situated above a feed kitchen 5, and comprises a grab bucket 6 attached to a hoisting cable 7 which can be displaced along a crossbeam 9 by means of a travelling cat 8 which can, in turn, move along a frame 11 by means of travelling wheels 10. The feed kitchen 5 contains piles of livestock feed 13-1, 13-2, 13-3 at various feed positions, with an empty feed position being denoted by reference numeral 12.

Reference numeral 14 denotes a feed-unloading point. A feed-waste collecting channel 15 extends to a feed-waste collecting depot 16.

On the grab bucket 6, a laser distance meter 17 is provided which emits a laser beam 18. On the travelling cat 8, a 3D camera 19 with an image field 20 is provided. Reference numeral 21 denotes a weighing sensor at a feed position. In principle, only a sensor is necessary, and a 3D camera may for example also be provided on the grab bucket which will therefore always be at a very short measuring distance from a feed position to be measured.

The autonomous feed wagon 3 comprises a feed-collecting receptacle 22 on a vehicle frame 23 with wheels 24.

The feed-displacing device 2 serves to compose animal feed and dispense it to a feed-collecting receptacle. To this end, the control unit 4 controls the grab bucket 6 which is displaceable in the directions indicated by the three double arrows above the feed kitchen 5 by means of the travelling wheels 10 and the travelling cat 8, as well as the hoisting cable 7. The grab bucket 6 can then grab one or more grab buckets of livestock feed from one or more types of livestock feed from the piles of livestock feed 13-1, 13-2 and 13-3. Obviously, the number of piles of livestock feed is not limited thereto. The amounts of livestock feed which have been grabbed successively can then be unloaded at a feed-unloading point 14 into an autonomous feed wagon 3 which can be driven to said location. After the feed wagon 3 has been filled, it can drive off autonomously in order to unload the livestock feed at a desired position. Obviously, other feed-collecting receptacles are also possible, such as conveying belts and trays suspended from rail systems and the like.

In the feed kitchen 5, reference numeral 13-3 denotes a new untouched block of livestock feed. Reference numeral 13-1 denotes a block of livestock feed from which a few bites have already been taken, as a result of which its shape has become irregular. Reference numeral 13-2 denotes a block of livestock feed which has been used up (almost) completely. At this position, there is too little livestock feed to be able to carry out any grabbing in a reliable or efficient manner. In the prior art, this position is cleaned manually, for example brushed or the feed is brushed to another pile in order to make room for a new block of livestock feed. With the present invention, the device 2 will clear up this feed position/pile of livestock feed 13-2 under the control of the control unit 4 if the respective feed position/pile of livestock feed 13-2 meets a predetermined clearing-up criterion.

The clearing-up criterion for example relates to the fact that an insufficient amount of livestock feed is present. This may, for example, be determined by means of information about the height of the feed pile 13-2 which information can in this case be determined by scanning with the laser beam 18 of the laser distance meter 17. This may be effected by moving the grab bucket 6, which is provided with the laser distance meter 17 on it, until it is over the feed pile 13-2 and to measure the height there. It is also possible to scan the feed pile 13-2 with the laser distance meter in order to obtain a feed height profile by scanning. This may also be repeated one or more times, for example along parallel lines, so that a surface of the livestock feed pile 13-2 can be determined. In all cases, using the height information obtained, an estimate can be made of the volume and from that of the amount of livestock feed which is present in the feed pile 13-2. If, for example, the height or average height is below a predetermined height $h_2$ (see FIG. 2), the control unit will indicate that the livestock feed of the feed pile 13-2 is no longer suitable for use in animal feed to be composed and classify it as livestock feed to be removed. The control unit 4 then controls the grab bucket 6 in such a manner that it picks up as much as possible of the livestock feed from pile 13-2 and moves it to the feed-waste collecting channel 15. From there, said livestock feed will slide towards the feed-waste collecting depot 16. Obviously, many other ways of waste removal are possible, such as direct dumping in a feed-waste collecting depot 16, or dumping on a conveyor belt or the like. After the livestock feed to be removed has been grabbed, a subsequent height measurement or scan of the livestock feed at the position of the feed pile 13-2 may be carried out. If the height/average height has subsequently dropped below a predetermined value $h_1$, which is lower than $h_2$, the feed position is considered to be sufficiently clean, partly because the feed grabber can no longer grab livestock feed in an efficient manner below this value. The feed position is then ready to receive a new amount of livestock feed. The abovementioned clearing-up operation relates to a cleaning operation which is carried out, for example, if it is desired to remove residual amounts, for example on a base which stimulates the development of heat or mould, or will otherwise affect the quality of the bottom livestock feed in a negative way. If, for example, it is possible to ensure said quality for a relatively long period of time, it is also possible to "re-use" the feed pile 13-2 by moving it as much as possible towards a feed pile which is still sufficiently high, such as feed pile 13-1, obviously provided that this is of the same type. This results in a higher feed pile 13-2, but, more particularly, in the removal of a feed pile from which it was no longer possible to grab any livestock feed in a quick and efficient manner. Consequently, not only is the number of targets/positions for the feed gripping device limited, but it is also ensured that fewer grabbing actions have to be carried out in order to fulfil a feed order, as grabbing no longer takes place from a feed pile which is too small, which could result in an insufficiently large amount of feed being grabbed and would then necessitate additional grabbing actions which requires a lot of time.

Obviously, there are also other ways of obtaining information about the livestock feed at a feed position. Thus, it is possible to use a 3D camera 19 with an image field 20 to obtain an image of a feed pile in order to extract the desired height information in a single operation. This single image results in a two-dimensional height profile without the need for scanning and can be used to calculate the total volume of the feed pile in a relatively simple manner. Again, alternatively or additionally, a weighing sensor 21 may be fitted underneath a feed position 12. This weighing sensor 21 is, for example, designed to weigh an amount of livestock feed situated on top of it. If this amount drops below a certain value, the feed pile situated on top may also be earmarked as having to be removed, after which a similar operation can be carried out. Of course, other ways of starting a cleaning operation are also possible. For example, an operator may choose to remove a type of livestock feed irrespective of the remaining amount of livestock feed. This may occur, for example, when changing from one type of livestock feed to another, when livestock feed has rotted, etc. By giving the device a corresponding instruction, it will clean the feed position in question.

With another cleaning operation, the top 5 to 10 cm of the new untouched block 13-3 may be removed, for example because the quality thereof has deteriorated due to overheating. Of course, this is optional and it is possible to remove a layer of a different thickness.

It should be noted that the feed-unloading point 14 and the feed-waste collecting position 15/16 are different in this case. This ensures that no residual waste ends up in the animal feed which is still to be composed. This offers advantages, as the (residual) feed to be removed may be contaminated as a result of having been mixed with waste situated on the ground. Of course, it is still possible for the feed-unloading position and the feed-waste collecting position to be identical, provided the animal feed to be composed and the residual feed to be removed are clearly separated (administratively), wherein separate disposal from the position is advantageous.

In order to prevent, in particular autonomous, feed-collecting receptacles needlessly have to wait for a relatively long time at the feed-unloading position 14, the control unit will preferably only carry out a clearing-up operation if there is sufficient time to do so. This may be the case, for example, if no feed-grabbing instruction ("feed order") has been received for at least a certain amount of time. This principle may be compared to the appearance of a screen saver after a predetermined period of inactivity. With this option, there is no need for any communication between the feed wagon 3 and the control unit 4/the grab bucket 6. However, if, for example, the feed wagon 3 can send a "ready instruction" to the control unit 4 or the grab bucket 6, the latter two can immediately start a cleaning operation, if this is required. It will be clear that this offers a larger number and more flexible possibilities of cleaning. In order to be able to detect whether filling of the feed wagon 3 has finished, the feed wagon 3 may be provided with a weighing sensor 25 which weighs the amount of livestock feed which has been received. Once the feed order has been completed, that is to say the desired weight is measured by the weighing sensor 25, a vehicle control unit (not shown) can emit a "ready signal" to the control unit 4.

FIG. 2 diagrammatically shows a diagram of one-dimensional height profiles of a number of different feed piles.

Reference numeral I denotes a first feed pile, the height of which has been established, for example by means of a laser height scan, to be largely between the values $h_1$ and $h_2$. As has been indicated above, $h_2$ denotes a lower limit, below which the livestock feed is earmarked as "to be cleared up" or "to be removed", and $h_1$ denotes an absolute limit, below which grabbing ceases to be carried out. In other words, the livestock feed on the feed pile I may be cleared up or may be earmarked "to be removed".

By contrast, the feed pile IIa has a height profile which is entirely below height $h_1$. This feed pile has thus been sufficiently cleaned and is ready to receive a new feed pile, denoted here by IIb.

Finally, reference numeral III denotes a feed pile which has a highly irregular height profile. A significant part, denoted by x, is below the threshold $h_2$, below which said portion of the feed pile will be earmarked as "to be cleared up" or "to be removed". However, another portion is still over the threshold $h_2$. Depending on the wishes of the user, the grab bucket (not shown) can then either remove portion x, or already clear up portion x now by picking up as much of it as possible and deposit it on the adjacent portion of pile II or deposit it on another but similar type of pile, or continue to grab livestock feed from the feed pile 13-3, but only on the portion which is situated above the threshold $h_2$. Thus, for example, the clearing-up operation could be carried out if the entire pile II meets a removal condition, such as dropping to a height below $h_2$.

It should be noted here that the height limits $h_1$ and $h_2$ have been shown as being equal for the different feed piles I, IIa and III. Of course, these limits can also be different for different types of livestock feed.

The exemplary embodiments illustrated here are non-limiting examples. The scope of protection of the invention is also determined by the attached claims.

The invention claimed is:

1. Device for displacing livestock feed, comprising:
a feed gripping device, and
a control unit for the feed gripping device,
wherein the feed gripping device comprises a grab bucket which can be operated by the control unit and can be positioned with a vertical and at least one horizontal degree of freedom above a feed kitchen, wherein the feed kitchen comprises at least one feed position on which at least one type of livestock feed is provided,
wherein the control unit is designed to receive a feed order, comprising information for composing an amount of animal feed from one or more types of livestock feed provided in the feed kitchen, and for carrying out the following one or more times on the basis of the feed order:
positioning the grab bucket at a desired grabbing position with respect to the feed kitchen,
operating the grab bucket to make the grab bucket grab at least a part of the livestock feed situated underneath said grabbing position,
positioning the grab bucket at a desired feed-unloading point for composing the amount of animal feed to be composed which is to be fed to animals, and
operating the grab bucket to make the grab bucket unload the livestock feed which the grab bucket has grabbed at the feed-unloading point,
wherein the control unit is furthermore designed to earmark, if at least one predetermined clearing-up criterion has been met, the livestock feed for a clearing-up operation at least at part of at least one feed position in the feed kitchen which does not form part of a feed order, and to make the device carry out a clearing-up operation,
wherein the clearing-up operation comprises the removal of at least part of the livestock feed on the part of said feed position by displacing said part of the livestock feed to another position in the feed kitchen.

2. Device according to claim 1, wherein the clearing-up operation comprises a combining operation, comprising grabbing at least a part of the livestock feed on the part of said feed position and displacing the grabbed livestock feed either to another part of said feed position or to another feed position on which livestock feed of the same type as the grabbed livestock feed is provided.

3. Device according to claim 1, wherein the clearing-up operation is a cleaning operation and removing the livestock feed comprises grabbing, displacing and unloading the livestock feed at a feed-waste collecting position.

4. Device according to claim 3, wherein the cleaning operation comprises the removal of a predetermined upper part of the livestock feed at a feed position.

5. Device according to claim 1, wherein the another position in the feed kitchen is a feed-waste collecting position which is different from the feed-unloading point.

6. Device according to claim 1, wherein the at least one clearing-up criterion includes that the device is not busy carrying out a feed order.

7. Device according to claim 1, wherein the at least one clearing-up criterion includes that the control unit does not contain any unfinished feed order, and/or that the control unit only contains one or more feed orders which do not have to be started within a predetermined time.

8. Device according to claim 1, wherein the at least one clearing-up criterion includes that the control unit has not received a feed order for at least a predetermined time period.

9. Device according to claim 1, wherein the at least one clearing-up criterion includes that the control unit contains a clearing-up instruction which is still to be carried out.

10. Device according to claim 1, wherein the at least one clearing-up criterion includes a removal condition, and wherein the device further comprises a measuring device which is designed to detect, at least for one feed position, whether said feed position meets the removal condition.

11. Device according to claim 10, wherein the removal condition includes that a value of a predetermined parameter of the livestock feed at said at least one feed position, or a part thereof, meets a predetermined removal criterion.

12. Device according to claim 11, wherein the predetermined parameter comprises an average height or maximum height of the livestock feed at the feed position, or a part thereof, and wherein the removal condition includes that the parameter value is smaller than a first threshold height.

13. Device according to claim 11, wherein the parameter comprises a residual amount of livestock feed at the feed position, or a part thereof, and wherein the removal condition includes that the parameter value is smaller than a first threshold amount.

14. Device according to claim 11, comprising a measuring device designed to measure the value of the predetermined parameter for one or more feed positions.

15. Device according to claim 14, wherein the measuring device is provided on the feed gripping device.

16. Device according to claim 14, wherein the measuring device comprises a height-measuring and/or distance-measuring device.

17. Device according to claim 16, wherein the measuring device comprises a laser distance-measuring device, an ultrasound distance-measuring apparatus and/or a 3D-camera.

18. Device according to claim 14, wherein the measuring device is designed to scan a feed position, preferably during displacement of the feed gripping device.

19. An assembly comprising:
a feed kitchen, and
a device for displacing livestock feed, the device further comprising:
a feed gripping device, and
a control unit for the feed gripping device,
wherein the feed gripping device comprises a grab bucket which can be operated by the control unit and can be positioned with a vertical and at least one horizontal degree of freedom above a feed kitchen, wherein the feed kitchen comprises at least one feed position on which at least one type of livestock feed is provided,
wherein the control unit is designed to receive a feed order, comprising information for composing an amount of animal feed from one or more types of livestock feed provided in the feed kitchen, and for carrying out the following one or more times on the basis of the feed order:
positioning the grab bucket at a desired grabbing position with respect to the feed kitchen,
operating the grab bucket to make the grab bucket grab at least a part of the livestock feed situated underneath said grabbing position, positioning the grab bucket at a desired feed-unloading point for composing the amount of animal feed to be composed which is to be fed to animals, and operating the grab bucket to make the grab bucket unload the livestock feed which the grab bucket has grabbed at the feed-unloading point, wherein the control unit is furthermore designed to earmark, if at least one predetermined clearing-up criterion has been met, the livestock feed for a clearing-up operation at least at part of at least one feed position in the feed kitchen which does not form part of a feed order, and to make the device can out a clearing-up operation, wherein the clearing-up operation comprises the removal of at least part of the livestock feed on the part of said feed position by displacing said part of the livestock feed to another position in the feed kitchen, and wherein the feed kitchen comprises at least one feed position for grabbing material provided in the feed kitchen.

20. An assembly according to claim 19, furthermore comprising an autonomous clearing device, which is designed to remove at least part of the material in the feed kitchen under the control of the control unit.

21. A system comprising:

a device for displacing livestock feed, the device further comprising:
  a feed gripping device, and
  a control unit for the feed gripping device; and an autonomous and/or self-propelled vehicle which is designed to receive the material which has been grabbed by the grab bucket and is to be unloaded at an unloading position in said vehicle, and for subsequently dispensing the material again at another position, wherein the feed gripping device comprises a grab bucket which can be operated by the control unit and can be positioned with a vertical and at least one horizontal degree of freedom above a feed kitchen, wherein the feed kitchen comprises at least one feed position on which at least one type of livestock feed is provided, wherein the control unit is designed to receive a feed order, comprising information for composing an amount of animal feed from one or more types of livestock feed provided in the feed kitchen, and for carrying out the following one or more times on the basis of the feed order:

positioning the grab bucket at a desired grabbing position with respect to the feed kitchen, operating the grab bucket to make the grab bucket grab at least a part of the livestock feed situated underneath said grabbing position, positioning the grab bucket at a desired feed-unloading point for composing the amount of animal feed to be composed which is to be fed to animals, and operating the grab bucket to make the grab bucket unload the livestock feed which the grab bucket has grabbed at the feed-unloading point, wherein the control unit is furthermore designed to earmark, if at least one predetermined clearing-up criterion has been met, the livestock feed for a clearing-up operation at least at part of at least one feed position in the feed kitchen which does not form part of a feed order, and to make the device carry out a clearing-up operation, and wherein the clearing-up operation comprises the removal of at least part of the livestock feed on the part of said feed position by displacing said part of the livestock feed to another position in the feed kitchen.

22. A system according to claim 21, wherein the vehicle comprises a vehicle control unit which is operatively connected to the control unit and is designed to deliver an instruction or information to the control unit.

23. A system according to claim 22, wherein the instruction or information comprises a feed order.

24. A system according to claim 22, wherein the vehicle comprises a weighing device for weighing unloaded material which has been received in the vehicle, and wherein the instruction or information comprises information with respect to a weighed amount of material.

25. A system according to claim 22, wherein the vehicle control unit is designed to emit a ready instruction to the control unit, and wherein the control unit is designed to carry out the clearing-up operation on the basis of the ready instruction.

* * * * *